US009795901B2

(12) United States Patent
Downey et al.

(10) Patent No.: US 9,795,901 B2
(45) Date of Patent: Oct. 24, 2017

(54) SLUDGE EXTRACTION APPARATUS AND METHOD (71) Applicant: newterra ltd., Brockville (CA)

(72) Inventors: Jason Downey, Ottawa (CA); Benjamin Wilson, Elizabethtown (CA)

(73) Assignee: newterra ltd., Brockville, Ontario (CA)

( * ) Notice: Subject to any disclaimer, the term of this patent is extended or adjusted under 35 U.S.C. 154(b) by 9 days.

(21) Appl. No.: 15/063,354

(22) Filed: Mar. 7, 2016

(65) Prior Publication Data

US 2017/0252675 A1    Sep. 7, 2017

(51) Int. Cl.
B01D 21/24 (2006.01)
B01D 21/00 (2006.01)
B01D 21/02 (2006.01)
B01D 21/20 (2006.01)
B01D 21/18 (2006.01)

(52) U.S. Cl.
CPC ..... *B01D 21/2461* (2013.01); *B01D 21/0003* (2013.01); *B01D 21/0036* (2013.01); *B01D 21/0051* (2013.01); *B01D 21/10* (2013.01); *B01D 21/18* (2013.01); *B01D 21/20* (2013.01); *B01D 21/245* (2013.01); *B01D 21/2444* (2013.01)

(58) Field of Classification Search
CPC .... B01D 21/0006; B01D 21/04; B01D 21/18; B01D 21/183; B01D 21/245; B01D 21/2477
USPC .................................. 210/527, 803
See application file for complete search history.

(56) References Cited

U.S. PATENT DOCUMENTS

| 3,797,664 | A | * | 3/1974 | Pentz | B01D 21/245 |
| | | | | | 210/527 |
| 3,920,558 | A | * | 11/1975 | Lind | B01D 21/04 |
| | | | | | 210/527 |
| 4,190,541 | A | * | 2/1980 | Wade | B01D 21/245 |
| | | | | | 210/527 |
| 4,830,748 | A | * | 5/1989 | Hall | B01D 21/0006 |
| | | | | | 210/525 |
| 4,927,537 | A | * | 5/1990 | Meurer | B01D 21/04 |
| | | | | | 210/527 |
| 5,047,150 | A | * | 9/1991 | Mitchell | B01D 21/18 |
| | | | | | 210/527 |
| 5,366,638 | A | * | 11/1994 | Moore | B01D 21/245 |
| | | | | | 210/527 |
| 5,720,891 | A | * | 2/1998 | Cook | B01D 21/245 |
| | | | | | 210/527 |
| 2005/0211637 | A1 | * | 9/2005 | Sower | E02F 3/9256 |
| | | | | | 210/803 |

(Continued)

FOREIGN PATENT DOCUMENTS

DE    3408900    * 9/1985

*Primary Examiner* — Christopher Upton
(74) *Attorney, Agent, or Firm* — Stuart L. Wilkinson (57) ABSTRACT A sludge collector arrangement has a settling tank having side walls sloping downwardly and inwardly towards the base of the tank to from a V-base. A sludge collection unit located in the bottom of the tank has one funnel part facing in one direction and another funnel part facing in the other direction so that when the unit is driven backwards and forwards in the V-base, sludge is driven into one or other of the funnel parts. The funnel parts communicate with a central chamber and a port in a wall of the chamber allows sludge to be drawn by a suction pump from the chamber for subsequent disposal.

18 Claims, 6 Drawing Sheets

(56) References Cited

U.S. PATENT DOCUMENTS

2009/0026131 A1\* 1/2009 Nielsen .............. B01D 21/2477
          210/523
2014/0151310 A1\* 6/2014 Downey ............ B01D 21/2444
          210/800

\* cited by examiner

SLUDGE EXTRACTION APPARATUS AND METHOD

FIELD OF THE INVENTION

This invention relates to a method and apparatus for extracting sludge and has particular but not exclusive application to extracting sludge from wastewater clarifying tanks.

DESCRIPTION OF RELATED ART

In the treatment of wastewater, a common facility is a settling tank such as a clarifying tank. Wastewater clarifiers are used to remove suspended solids from water such as grey water, effluent from mining, industrial and construction sites, and sewage. The clarifiers work by the process of flocculation in which suspended microscopic particles in the range 1 to 1000 micrometers are caused to come out of suspension as flakes or "floc". Known wastewater clarifiers may take the form of circular, square or rectangular tanks having a wastewater inlet and cleansed water outlet and a settling zone. They often use clarification media such as a matrix of clarification tubes or slant plates (lamella) to stimulate separation and settlement of solids from the wastewater. In use, wastewater to be treated is pumped into the clarifying tanks and cleaned water is pumped out of it. The separated solids are deposited as sludge in the bottom of the tank. The sludge is periodically collected and removed from the bottom of the tank so that further processing of newly introduced wastewater can take place. In other forms of settling tank, sludge also accumulates in the bottom of the tank.

Typically a rectangular tube clarifier tank has wastewater entering at one end, passing down the length of the tank through a settling zone where turbulence in the introduced water abates and then a clarifying zone. Over the settling zone, the wastewater motion is stabilized to render the wastewater more quiescent for subsequent processing in the clarifying zone. In the clarifying zone, flocculation and separation of downwardly falling solids from upwardly moving water occurs provided that the water is not turbulent, but has an even flow throughout the clarifying zone. The stabilization zone takes a certain proportion of the tank length and the clarifying media are mounted in a contiguous length of the tank. Usually the clarifying media fills that length of the tank from one side to the other meaning that there is no operator access from the top of the tank to the sludge collection zone in the bottom of the tank. Of particular interest is a tank configuration disclosed in copending U.S. patent application Ser. No. 14/083,586, Water treatment apparatus and method of use, filed Nov. 19, 2013, the tank having a generally rectangular form with an access lane running along the tank length allowing manual intervention from the top of the tank to settling and sludge collection zones. The tank has an entry conduit extending along the length of the tank and receives water from a water inlet. Water outlet ports are distributed along the length of the conduit for directing water sideways from the conduit into the settling zone. A water exit trough spaced across the tank from the entry conduit and extending the length of the tank receives clarified water that has flowed from the settling zone through a clarification zone where it has dropped solids to the bottom of the tank as sludge.

Various designs of sludge collection equipment are known for clarifiers and other forms of settling tanks. Generally, all parts of the equipment are mounted in the bottom of the tank. One form of sludge collection equipment has a pipe lattice in which suction is developed to suck the sludge off the tank floor. The sludge is sucked through nozzles and a drive to the pipe lattice is operated so that, in a sludge collection cycle, the tank floor is subjected to some extent or other to the suction developed in the collection equipment. In this way, sludge is vacuumed off the tank floor and piped away for disposal. Such a collection arrangement is used for tanks with flat bases.

Another known form of tank has side walls which slope inwardly to a narrow region at the base. For such a tank configuration, a different form of sludge collection apparatus is known. In this apparatus, a screw conveyor is mounted in the bottom of the tank and is operated to grab and convey sludge that has accumulated in the base of the tank to one or both ends of the tank where it is taken out through a port in the end wall for disposal.

DETAILED DESCRIPTION OF THE INVENTION INCLUDING THE PRESENTLY PREFERRED EMBODIMENTS

Figure 1:
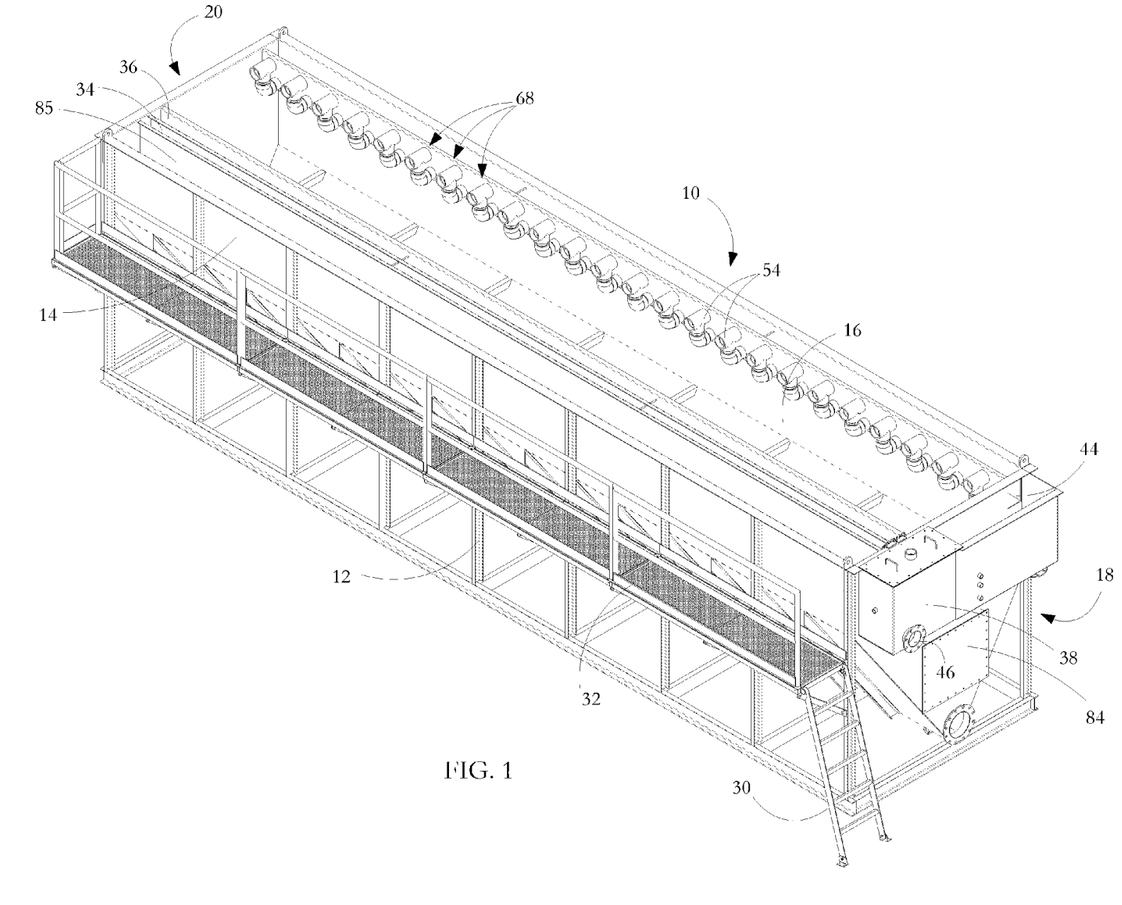
FIG. 1 is perspective view of a water clarifying tank according to an embodiment of the invention.
Figure 2:
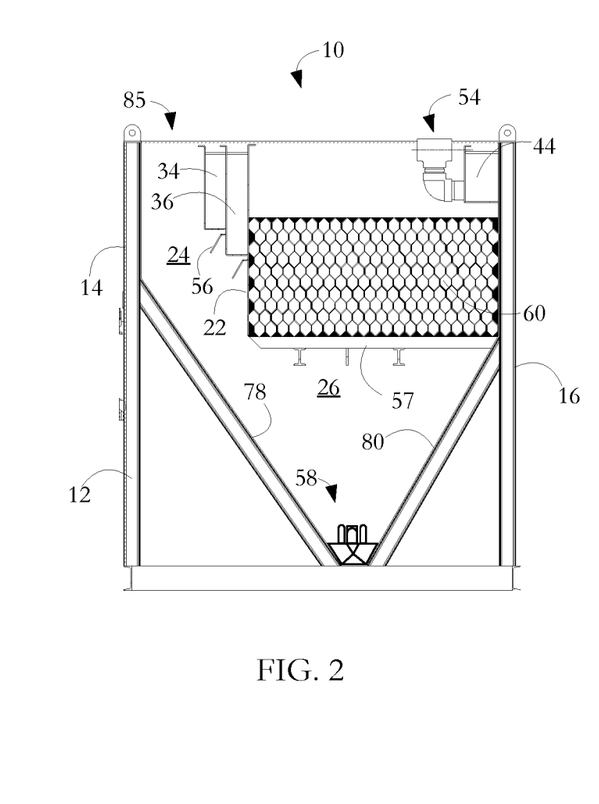
FIG. 2 is a cross-sectional view of the apparatus of FIG. 1.
Figure 3:
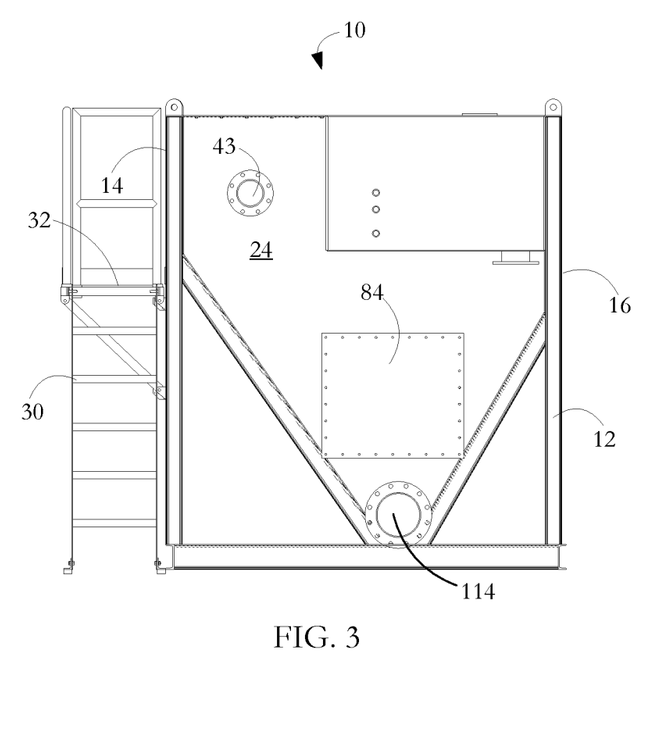
FIG. 3 is a front end view of apparatus of FIG. 1.

Referring in detail to FIGS. 1-3, there is shown one form of clarifier apparatus for clarifying wastewater. The clarifying apparatus has a rectangular box tank having an outer support frame 12, sides 14, 16 and ends 18, 20. As shown in FIG. 2, a wall 22 divides the clarifier along its length into a settling zone 24 of the order of 2 feet in width and clarification zone 26 of the order of 6 feet in width. The box tank has a V-form floor consisting of sloping walls 78, 80 supported by the support frame 12. Manual access to the clarifier for inspecting its operating state as it functions to clarify wastewater is enabled by ladder 30 and catwalk 32.

Figure 4:
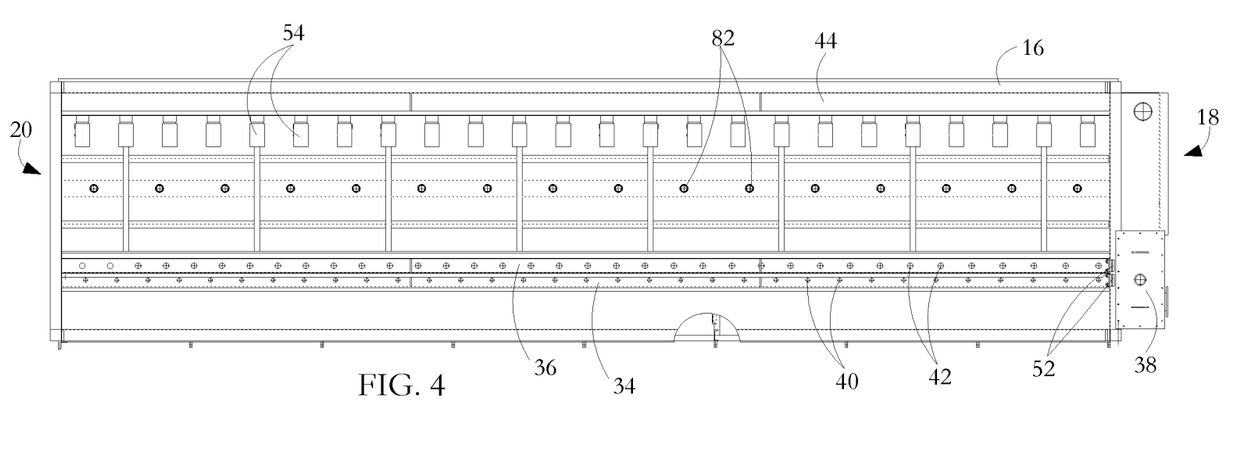
FIG. 4 is a plan view of a part of the apparatus of FIG. 1.

Extending the full length of the tank are two troughs 34, 36, the trough 36 being for handling wastewater processing at a higher rate than that of the trough 34. The troughs are rectangular in section, with the high capacity trough 36 having a greater depth than the low capacity trough 34 to prevent spillage. At the end wall 18, the troughs are connected to a wastewater inlet tank 38 through which wastewater is pumped into one or other of the troughs 34, 36. As shown in FIG. 4, there are holes 40, 42 in the bottoms of the respective troughs 34, 36 through which wastewater pumped into the troughs flows out into the settling zone 24. The clarifying apparatus illustrated has a two-directional flow of wastewater being treated. The wastewater is initially delivered to one of the troughs 34, 36 in a flow extending along the longer aspect of the box tank and then, once driven from the trough 34 or 36 by further pumping of wastewater into the trough, it flows evenly through the clarification zone 26 to an outlet trough 44, and flows along the exit tough to an outlet tank 45.

Referring back to FIG. 1, wastewater is received into the clarifier through the inlet tank 38. The wastewater is in turbulent motion in the tank 38 which ensures that fine particulate solids are retained in suspension and so kept mobile while reducing the energy of wastewater entering the tank at high velocity through the inlet port 46. The wastewater is pre-treated to remove large solid materials before being piped at a controlled rate into the inlet tank 38. The presence of the tank 38 provides a measure of stabilization for the wastewater before it flows from the tank 38 into one or other of the troughs 34, 36 depending on whether a respective gate 52 is open or closed. In order to achieve effective operation at high throughput, it is important that the flow of wastewater from the trough 34, 36 into the settling zone 24 is evenly distributed down the length of the clarifier. If flow is slower than optimal, the throughput is not maximized. If the flow is faster than optimal, the water entering the exit trough 44 may not be evenly clarified along the length of the clarifier.

The trough 34 has small holes 40 and is used to achieve a flow rate in the range of 200-400 gallons per minute (gpm) while the trough 36 has relatively larger holes 42 and is used to achieve a flow rate in the range 400-800 gpm. The operator opens or closes the respective gate 52 at the entrance of the troughs to channel flow into the appropriate trough depending on the desired flow rate.

Extending along the other side of the tank is the clarified water collection trough 44 which receives water from skimmer units 54 mounted along the length of the tank. In use, wastewater is piped into the inlet tank 38, flows out of the tank into one of the troughs 34, 36, enters the settling zone 24 from the active one of the troughs 34, 36, passes through the clarification zone, and exits at the side 16. In the clarification zone 26, colloidal particles in the wastewater undergo flocculation, a process in which small particles accumulate to form larger particles. The larger particles then settle in the settling zone so clarifying the water in the upper region of the settling zone.

It is useful to have different throughput rates available so as to accommodate differing demands at the installation site. In the example shown, two troughs 34, 36 with inlet delivery means and outlet holes 40, 42 tailored in size and flow rates are used to obtain desired throughputs at the clarifying apparatus. The clarifying apparatus can alternatively be made with a larger range of inlet troughs. In another alternative, a single trough that is adjustable to permit greater or lesser wastewater input can be used. As an alternative to the troughs shown in FIGS. 1 and 2, the wastewater inlet arrangement can use pipes. As in the case of the troughs, water outlet ports in the wall of the pipe (not shown) are arranged so that an even downward flow rate from the pipe into the settling zone 24 is obtained along the length of each pipe.

The inlet conduit arrangement is designed so that, to the extent possible, sludge, dirt and debris are cleared out of the conduit. Consequently, the outlet ports are oriented so that the wastewater flows downwardly to exit the conduit. In addition, the flow is made sufficiently fast that solid material is moved along and out of the conduit by the water flow. The escape speed of wastewater at the outlet ports is made sufficiently low that it does not cause significant mixing to the extent that effect that floc particles are sheared which would reduce the performance of the apparatus.

In order to obtain high throughput of wastewater, it is important that smaller particles flocculate rapidly to form larger particles and it is desirable also that the larger particles drop quickly through the settling and clarification zones 24, 26. To influence this positively, the wastewater is stabilized as quickly and as fully as possible after its entry to the clarifier tank. As indicated previously, the inlet tank 38 forms a first stage of stabilization as the wastewater travelling at high rate through the inlet pipe is brought to a halt in the tank 38. The wastewater flows from the tank interior into the selected trough 34, 36 through the appropriately operated gate 52 which is larger than the size of inlet port 46 and which receives water generally from the tank interior. A second stabilization stage occurs at deflectors 56 (FIG. 2) which are associated with each of the holes 40, 42 and act to diffuse the flow of water from the holes and so prevent jets of water from disturbing settling solids in the clarification zone 26 and settled solids in the crook 58 of the V-form floor 78, 80.

The deflectors 56 spread the wastewater that is injected through the holes 40, 42 both in a direction along the trough 34, 36 and in a plane perpendicular to the trough length. The function of the deflectors 56 is to minimize undesirable currents in the wastewater in the settling and clarification zones 24, 26 which might otherwise adversely impact both flocculation and settling. If the deflectors 56 were not in place, the speed of water injected through the holes 40, 42 might result in eddy currents having a flow speed and extent which are much greater than obtained with the deflectors in place. Preventing undesirable currents also increases the likelihood of achieving slow, even flow of wastewater from near the holes 40, 42 across the tank to the skimmer pipes 44.

A further optional technique for increasing the rate of flocculation is to use a matrix of clarification media such as tube media as shown in FIG. 2. A tube media matrix 60 is supported on a supporting frame 57 and fills an area of the clarification zone 26 from just below the skim level of the skimmer units 54, to the top of the V-wall at the outlet side. Influenced by the continued injection of wastewater into one of the inlet troughs and by the continuous drawing off of cleaned effluent at the skimmer units 54, the wastewater flows slowly from the settling zone 24 to the clarification zone 26 below the tube media matrix 60. The wastewater is drawn up through tubes in the media 62 with solids falling out in the media and sliding down the tubes. The sediment falls into the bottom 58 of the clarifier below the tube media. The clarified water flows out of the tops of the tubes 62 and into the skimmer units 54 which function to draw wastewater evenly across the media bed to ensure even flow distribution. Although the wastewater can be viewed as flowing across the clarifier, the tubes 62 of the tube media 60 slope along the length of the clarifier.

Tube and parallel plate settling media increase the settling capacity of the clarifier by reducing the vertical distance a particle must traverse before agglomerating to form larger particles. Consequently, the particle settling depth is significantly less than the settling depth of a clarifier which does not have clarification media, so reducing settling times. The tube media capture fine floc particles that escape the clarification zone 26 beneath the tube media and allow larger floc particles to travel to the tank bottom in a more easily settled form. Such clarification media can also reduce the footprint required compared with a clarifier without such media.

Another requirement in order to achieve even flow of wastewater across the tank is that the rate at which water exits the tank is the same regardless of the position along the tank. If this were not the case, then the flow rate across the tank would be higher where a relatively higher flow of water flows into the exit trough 44. Particularly in the case where the clarifier is prefabricated and shipped to an installation site, it may be difficult to find a location where the ground is perfectly level. Such sites are typically temporary sites such as construction sites or emergency service sites. However, they may be more permanent sites where the clarifier is to be rapidly installed and deployed. As shown in FIG. 1, drain points 68 for the cleaned water are occupied by skimmer units 54 that are mounted inboard of the exit trough 44. When the clarifier is set down on ground that is not perfectly level, the operator can adjust each of the outlet skimmer units 54 so that the horizontal pipe sections 70 are all at the same height and skim evenly when water is flowing through the system. It is important that water is drawn out of the clarifier evenly down the length of the clarifier to ensure even flow through the clarification media 60.

As shown in FIG. 2, the bottom of the clarification zone 26 is defined by walls 78, 80 which are configured as a V. The angles of the V-form floor 78, 80 are set sufficiently steeply that sludge does not settle on them but, instead, slides down and collects in the crook 58 of the V. Falling sludge thus automatically collects in a relative confined zone to facilitate its removal. In the embodiment shown, one side 78 of the V extends up into the settling zone 24 which allows the two sides 78, 80 to be joined together so as to maintain the desired slide angle while keeping the height of a prefabricated unit within the constraints set by container shipping.

The longbox clarifier illustrated in FIGS. 1, 2 and 3 presents a side lane 85 by means of which an operator standing on the catwalk 32 can see the amount of sludge accumulating in the tank bottom and can decide when it should be removed. In an alternative configuration, such an access lane can be a centrally situated lane.

Figure 5:
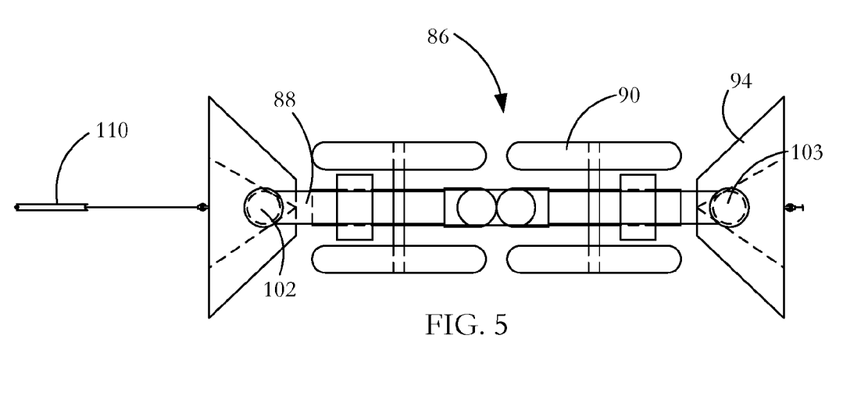
FIG. 5 is a plan view of a sludge collection unit according to an embodiment of the invention.
Figure 6:
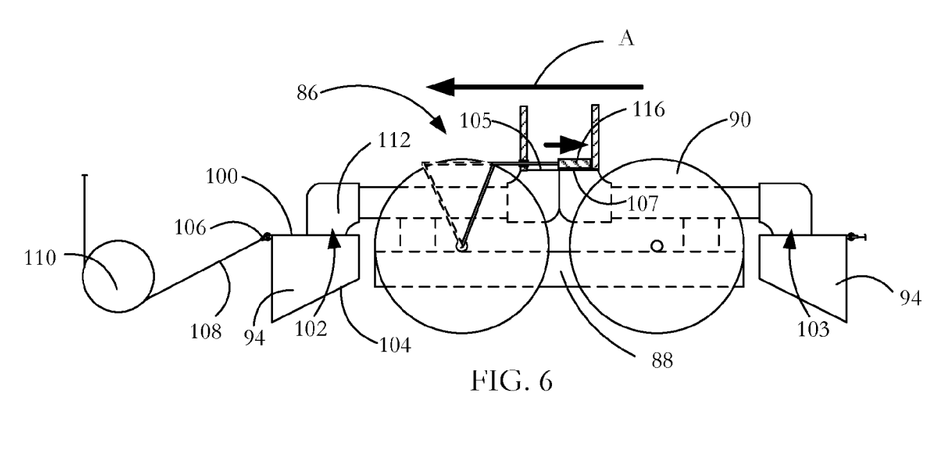
FIG. 6 is a side view of the sludge collection unit of FIG. 5.
Figure 7:
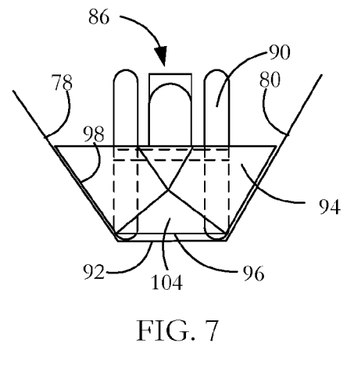
FIG. 7 is an end view of the sludge collection unit of FIG. 5.

Referring in detail to FIGS. 5 to 7, a sludge collection carriage 86 located in the bottom part of the clarifier tank has a chassis 88 and wheels 90. The tank bottom is bounded by a floor section 92 (FIG. 7) which supports the sludge collection carriage 86, and enables it to be moved backwards and forwards along the length of the tank to collect and remove settled sludge. At each end of the carriage are mounted funnel form sludge collectors 94 with the mouth of each collector being shaped over its lower part generally to match the contour of the bottom of the clarifier tank. The funnel collectors 94 each have a bottom edge 96 and side edges 98 for scraping the floor 92 and side walls 78, 80 of the tank as the carriage moves back and forth along the tank. The open mouths face away from the carriage and in opposite directions along the bottom of the tank. The funnel collectors 94 each have a top wall 100 and ports 102, 103 in the top walls to enable sludge to be sucked from the insides of the collectors using a suction hose. Each funnel collector has a separate hose, connected to ports 102, 103 that runs up the side lane 85 and out of the clarifier tank, connecting to a suction pump. Depending on which direction the carriage is running, suction is directed to port 102 or 103 by way of an actuated valve on the inlet of the pump. The design set point for travel speed of the carriage is typically 2 feet/minute, but is user-adjustable, depending on specific site conditions. The design flowrate for the suction pump is 5-10 gallons/minute, this also being user-adjustable, depending on specific site conditions. The floor section of each funnel collector is formed as a ramp 104 which slopes upwardly from the bottom edge 96 into the interior of the funnel.

A traction system attached to the carriage includes anchors 106 welded to the top wall 100 of each funnel collector 94 for use in applying a force to the carriage to reciprocally drag it along the clarifier tank. A cable 108 is attached to each anchor 106 for pulling the sludge collection carriage along the tank. The cable from each anchor is taken around pulleys 110 at each end of the clarifier tank and up both ends of the tank to terminating at a drive and take up spooling arrangement. The traction system has accessible elements at an upper open part of the tank to enable access to the traction system from the catwalk for control, servicing and repair.

In normal operation, to remove sludge, the traction system is operated to pull the sludge collection carriage backwards and forwards along the tank bottom. At the same time, suction is applied through a manifold 112. As the mouth of one or other of the moving funnel collectors 94 encounters sludge, the sludge is caused to enter the funnel and to ride up the ramp 104 both by the presence of more sludge encountered by the mouth of the moving collector 94 and by the application of suction through the manifold 112. The received sludge is vacuumed through the manifold and deposited in a collection vessel (not shown) outside the clarifier tank for subsequent treatment and disposal.

The apparatus has a first level inspection and repair mode in which, following draining of the clarifier tank, covers at one or both ports 114 (FIG. 3) at the ends of the tank are removed to allow inspection of the traction cable 108 and minor adjustment or repair of the funnel collectors 94 to the extent permitted by the port access. In a second level inspection and repair mode, the sludge collection carriage is lifted out of the clarifier tank through the access lane 85. In a third level inspection mode, the tank is drained and walk-in access is gained through the hatch 84 when the tank is drained for servicing or repair.

Figure 12:
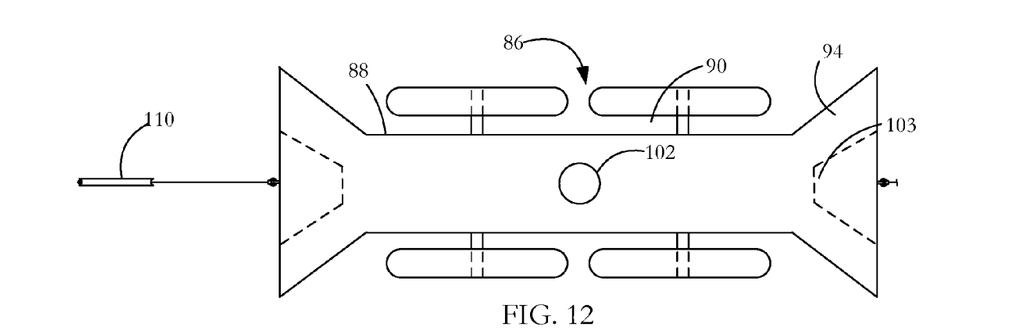
FIG. 12 is a plan view of a sludge collection unit according to another embodiment of the invention.
Figure 13:
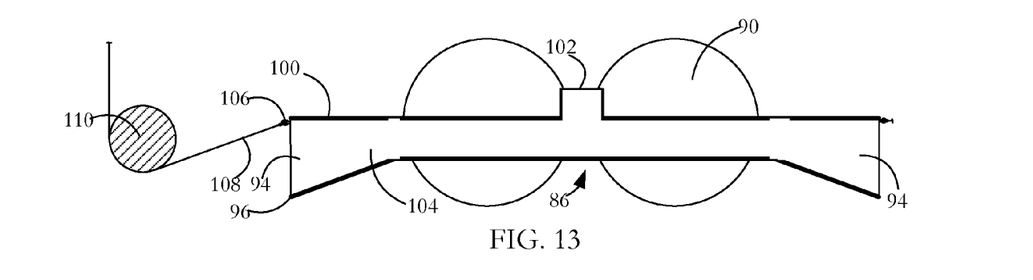
FIG. 13 is a side sectional view of the sludge collection unit of FIG. 12.

In an alternative embodiment of the invention illustrated in FIG. 6, the traction system includes a valve 116 mounted to the first and second funnel collectors 94. When the sludge collection carriage moves in the direction of arrow A, the port 102 is open and the port 103 is closed. When the sludge collection carriage moves in the opposite direction, port 105, which is in fluid communication with port 103, is open and port 107, which is in fluid communication with port 102, is closed. The traction system for moving the sludge collection carriage is linked 109 to the mounting for valve 116 to introduce a lost motion movement of the valve 116 upon change of carriage drive direction. In a further embodiment of the invention as shown in FIGS. 12 and 13, a single port is located at the center of the top wall 100 of the sludge collection unit 86. As the sludge collection unit moves backwards and forwards in the tank, sludge is pushed into the sludge collectors 94 and as further sludge is collected is moved progressively towards the center of the unit where it is drawn off through the center port 102.

Figure 8:
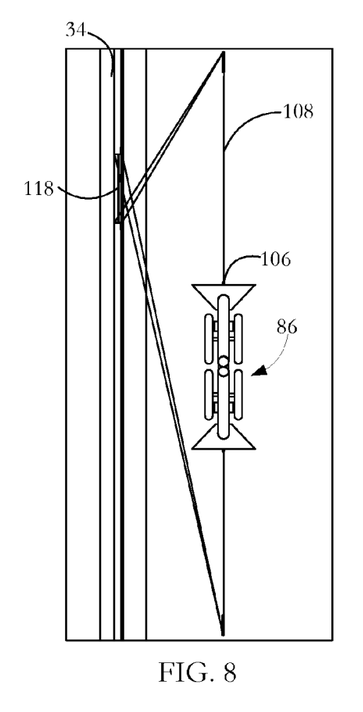
FIG. 8 is a plan view of a water clarifying tank according to an embodiment of the invention.
Figure 9:
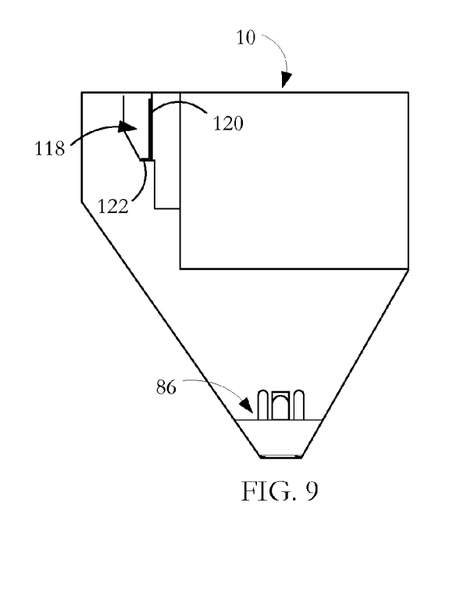
FIG. 9 is a cross-sectional view of the tank of FIG. 8.
Figure 10:
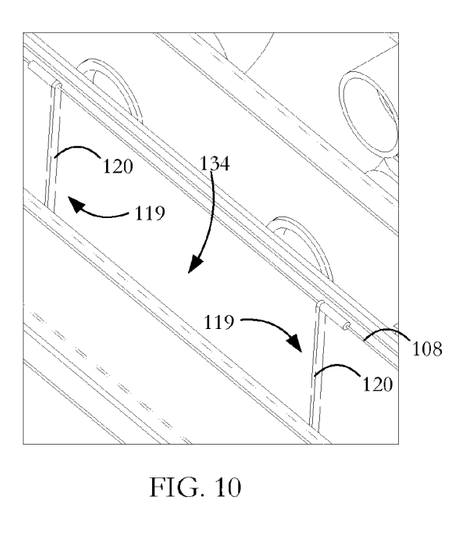
FIG. 10 is an isometric view to a larger scale of part of the tank of FIG. 8.

In a further alternative embodiment of the invention, the sludge collector has a counterpart apparatus at the top of the tank for scraping off accumulations of solid material that enter with the water to be processed and may tend to accumulate in the bottom of a water entry trough 34 instead of settling to the bottom of the main tank as sludge. As shown in FIGS. 8 and 10, a scraper 118 is formed from two spaced generally L-shaped members, each having a vertical limb 120 configured to support a horizontal limb 122 shaped and dimensioned for scraping the bottom of the trough 34. The scraper 118 is mounted to the ends of cables 108 of the sludge collection traction system so that as the sludge collector 86 is pulled in one direction along the clarifier tank, the scraper 118 is pulled in the opposite direction.

Figure 11:
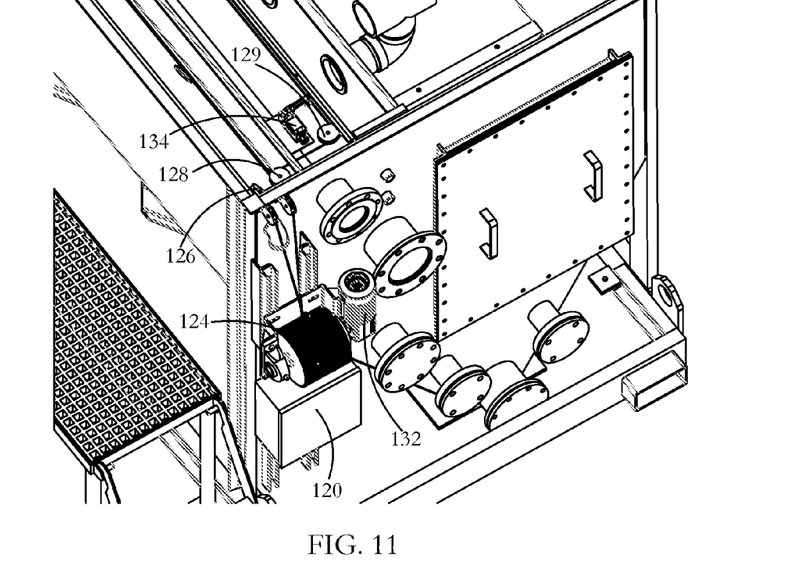
FIG. 11 is an isometric view of part of one end of the tank of FIG. 8.

As shown in FIG. 11, a drive drum at one end of the tank supports a single length of wound wire rope cable 108, the cable also being wound on an idler drum (not shown) at the other end of the tank. In one directional mode, the cable 108 is paid out from the top of the drive drum 124 and drawn in at the bottom of the drum 124, and vice versa for the opposite directional mode. As shown at one end of the tank, one part of the cable passes from the top of the drum 124 to the pulley 126, from where it passes down to the pulley 110 shown in FIG. 6 and then to one end of the collector carriage 86. The other part of the cable 108 passes from the bottom of the drum 124 around the pulleys 128, 129 from where it is routed along the side of trough wall 34 and is clamped to one of the scraper members 119 as shown in FIG. 10. A similar pulley configuration is implemented at the idler drum at the other end of the tank, with the cable from the other end being clamped to the other of the scraper members 119. As shown in FIG. 11, controlled drive to the cable is provided by means of a programmable logic controller housed in cabinet 130, a geared motor 132 and a limit switch 134.

Although the previously described embodiments show the invention in association with a clarifying tank, the invention has application to other forms of settling tank where sludge or other material collects in the base of a tank having a generally V-form bottom and the material must be removed without disruption to other processing function of the tank and associated apparatus. In a further alternative, the tank bottom can be of any cross sectional in which sludge or like material settles from an upper region of the tank to a more constricted region in the bottom of the tank: for example, the bottom of the tank can be U-shaped. In a further alternative, the wheels of the carriage alternatively or in addition bear against the sloping side walls at the bottom of the tank. In a further alternative, the suction port is in a side wall of the funnel collector instead of the top wall. In a further alternative, the funnel connector anchors are placed at a different location on the leading edge of the funnel collector and/or are the traction cable has multiple anchor points on the funnel collector.

Other variations and modifications will be apparent to those skilled in the art. The embodiments of the invention described and illustrated are not intended to be limiting. The principles of the invention contemplate many alternatives having advantages and properties evident in the exemplary embodiments.

What is claimed is:

1. A sludge collector arrangement comprising a settling tank having side walls sloping inwardly to form a uniform generally V-section contour at a base part of the tank, a sludge collection unit supported on the tank base part, a drive mechanism attached to the sludge collection unit for driving the sludge collection unit alternately in first and second opposed directions along the tank base part, the sludge collection unit having first and second funnel shaped parts having mouths facing in respective ones of the first and second opposed directions, each mouth shaped over a lower part thereof generally to match said contour, whereby driving of the sludge collection unit alternately in the first and second directions causes sludge deposited in the tank base part to be encountered by, and thereby to enter, mouths of respective ones of the funnel shaped parts, and a manifold arrangement connecting the first and second funnel shaped parts to a suction unit for sucking accumulated sludge from interiors of the funnel shaped parts.

2. A sludge collector arrangement as claimed in claim 1, the manifold arrangement comprising suction hoses.

3. A sludge collector arrangement as claimed in claim 1, the tank base part having a floor section, the sludge collection unit comprising a wheeled carriage supported on the floor section, the wheeled carriage wheelable back and forth in said first and second directions along the floor section.

4. A sludge collector arrangement as claimed in claim 3, at least one of the mouths having a bottom edge for scraping the floor section and side edges for scraping the side walls when the carriage is wheeled along the tank base part.

5. A sludge collector arrangement as claimed in claim 4, at least one of the funnel shaped parts having a ramp sloping upwardly from the mouth thereof to an interior part of the funnel shaped part.

6. A sludge collector arrangement as claimed in claim 1, at least one of the funnel shaped parts having an integral anchor for use in applying a force to move the sludge collection unit along the tank base part.

7. A sludge collector arrangement as claimed in claim 6, at least one of the funnel shaped part having a top wall, the anchor integral with the top wall.

8. A sludge collector arrangement as claimed in claim 6, further comprising a cable attached to the anchor for pulling the sludge collection unit along the tank base part.

9. A sludge collector arrangement as claimed in claim 8, the cable forming part of a traction system having accessible elements at an upper open part of the tank to enable operational control of, and access to, the traction system at the tank upper open part.

10. A sludge collector arrangement as claimed in claim 1, the drive mechanism including a mechanical valve part mounted to the first and second funnel shaped parts, the mechanical valve part movable between a first position enabling sludge suction from the interior of the first funnel shaped part but not the second funnel shaped part and a second position enabling suction of sludge through the second funnel shaped part but not the first funnel shaped part, the drive mechanism linked to the mechanical valve mounting to introduce a lost motion movement of the valve mechanism upon change of sludge unit drive direction whereby to change the mechanical valve position in response to changing sludge unit drive direction.

11. A sludge collector arrangement as claimed in claim 1, the tank including a closable and openable access port in at least one end wall of the tank, the access port in line with at least one of the funnel shaped parts and at least a part of the drive mechanism attached thereto.

12. A sludge collector arrangement as claimed in claim 11, further comprising a removable cover at said port, the drive mechanism including a cable having a generally horizontal part extending from an anchor point at said at least one funnel shaped part, the cable extending through a retainer integral with the cover allowing movement of the cable past the cover, the cable having an upwardly extending part from the retainer to an upper open part of the tank.

13. A sludge collector arrangement as claimed in claim 1, further comprising a deposit scraper unit located at an upper part of the tank for scraping a water inlet trough extending along the tank, a loop cable traction system between the sludge collection unit and the deposit scraper unit, the loop cable traction system operable in a first mode to pull the sludge collection unit in a first direction along the tank base part and to pull the deposit scraper unit in a second direction opposite to the first direction along the water inlet trough, and operable in a second mode to pull the sludge collection unit in the second direction along the tank base part and to pull the deposit scraper unit in the first direction along the water inlet trough.

14. A sludge collector arrangement as claimed in claim 1, the settlement tank having settlement apparatus extending generally along the length of the settlement tank and above the level of the sludge collection unit, the tank having an access region alongside the settlement apparatus, the access region and the sludge collection unit dimensioned to enable access to the sludge collection unit from the top of the settlement tank through said region for removal of the sludge collection unit from the settlement tank.

15. A method for collecting sludge from a settling tank having side walls sloping inwardly to form a uniform generally V-section contour at a base part of the tank, comprising supporting a sludge collection unit on the tank base part, the sludge collection unit having first and second funnel shaped parts having mouths facing in respective first and second opposed directions along the tank base part, each mouth shaped over a lower part thereof generally to match said contour, driving the sludge collection unit alternately in the first and second opposed directions along the tank base part so that sludge deposited in the tank base part is encountered by, and thereby enters, respective ones of the funnel shaped parts, and sucking accumulated sludge from interiors of the funnel shaped parts through a manifold arrangement connecting the first and second funnel shaped parts to a suction unit.

16. A method as claimed in claim 15, further comprising applying a reciprocating drive to drive the sludge collection unit back and forth along the tank base part.

17. A method as claimed in claim 15, further comprising driving the sludge collection unit using a traction system having first elements attached to the unit and having other elements accessible for control and service at the top of the tank.

18. A method as claimed in claim 17, the tank having an access lane at the top of the tank, the method further comprising servicing the sludge collection unit by removing the unit from the top of the tank using elements of the traction system.

* * * * *